United States Patent Office 3,563,792
Patented Feb. 16, 1971

3,563,792
PROCESS FOR COATING NONABSORBENT FIBRES
Hendrik H. J. Deuzeman, Watford, Ontario, Canada, assignor to Fiberglas Canada Limited, Toronto, Ontario, Canada
No Drawing. Continuation of application Ser. No. 468,949, July 1, 1965. This application Sept. 24, 1969, Ser. No. 871,749
Int. Cl. C03c 25/00
U.S. Cl. 117—126                                                5 Claims

ABSTRACT OF THE DISCLOSURE

A mat of nonabsorbent fibrous material such as glass fibers is coated with an aqueous slurry of clay having from 6 to 25% solids and comprising acicular calcium silicate particles of such shape and size that at least 20% thereof will pass through the interstices of the mat in only one direction, the remaining particles being of a size such as they will all pass through the interstices in any direction, the aqueous slurry comprising a methyl cellulose type protective colloid; a wetting agent consisting of a fatty acid amide or an amine salt serving to lubricate the acicular particles for longitudinal passage through the interstices of the mat and a viscosity control agent, thus facilitating entry of the particles into the interstices of the mat. The process aspects are also claimed, as well as the resulting treated mat.

---

This application is a continuation of U.S. Ser. No. 468,949, filed July 1, 1965, and now abandoned.

The present invention relates to coating of nonabsorbent fibres and more particularly to the coating of glass fibrous materials.

Glass fibrous caterials such as Fberglas (trademark of Fiberglas Canada Limited) are well known primarily for their thermal insulating capabilities and mats of this material are used in the form of batts for house insulation. Additionally, mats of Fiberglas may be shaped and pressed to a tubular form for application as pipe insulation or formed into blocks for furnace or vessel insulation. Because of its non-inflammable characteristic Fiberglas materials are being considered more in the construction industry in the form of pressed board. The material, however, cannot be classed as "high temperature" because it is presently limited to temperatures at which the organic bonding material is destroyed, nor classed as "fire resistant," i.e. useable at temperatures above the softening point of the individual fibers of the material (approximately 1000° F.) as above this temperature the material does not have sufficient mechanical strength to support its own weight.

Other forms of high temperature non-inflammable insulating materials available on the market are those containing basically asbestos fibres. This type of material does not have the resiliency of glass fibrous materials and due to its brittle nature tends to crack or chip easily. Asbestos materials are also relatively hard thus cutting or sawing this material presents a problem. Asbestos materials have been found to be considerably heavier than comparable materials of glass fibre and due to this extra weight are more awkward to install. There is thus a need for a light weight, easily manageable, insulating, non-combustible high temperature resistant or even fire resistant material.

It is known that when some glass materials are raised above the temperature of their softening point if the glass devitrifies or crystallizes that in this crystallized form it will have a higher softening point and hence increased mechanical strength. This crystallization of the glass may be encouraged by close contact of particles of refractory minerals, such as silica, calcia, alumina, titania et al. and/or their compounds. This is believed to be related to the phenomenon of seeding, and when the material is heated above its softening point the crystals appear to have a tendency to grow, causing devitrification of the material. I have found that if silicate-silica materials are closely associated with the glass fibrous materials such as in the form of a coating, that the glass fibres appear to be encouraged to react and/or devitrify, with the result that the product exhibits substantially reduced shrinkage on heating above the softening of the glass.

Prior attempts have been made to closely associate materials with the fibres, particularly shortly after the forming stage of the fibre to obtain the effect outlined above. In the processing of glass fibrous felt material, after the glass fibres have been formed by a known process, an organic binder is usually sprayed onto the fibres which when the material is pressed under heat forms a coherent felt of joined fibres. In an attempt to increase the temperature resistance of the glass fibrous felt a modified binder containing silicates and/or other minerals as a suspension in the binder material was sprayed onto the fibres and the material formed into felts. This treatment appeared to effect some improvement in the material as regards the temperature it was capable of withstanding, however, such improvement was not available in conjunction with all glass compositions, and/ or in a sufficient degree for all purposes.

Another prior attempt formed a suspension of clay in water in the presence of a non-fugitive wetting agent, and introduced into the interstices between the fibres of the mat. The clay filler was applied after the organic binder, as previously mentioned, had been applied to the fibre. This filler presented also some improvement in the capability of the material to withstand higher temperatures however, such improvement was not acceptable for commercial application.

A further attempt which combined the above two outlined previous treatments, i.e. the use of the modified binder and the clay suspension, resulted in a considerable improvement. The resulting treated fibrous material was found capable of withstanding temperatures well above the actual softening point of the fibres. This was, for example, the case of a specific glass-and-mineral composition which stood up to 1800° F. for a period of several hours, after which period the product had fulfilled its function and was not intended for re-use.

It is one feature of the present invention to provide a process of treating materials made of nonabsorbent fibres in such a fashion that the individual fibres of the material are coated.

It is a further feature of the present invention to provide products made of nonabsorbent fibres which are capable of continually withstanding temperatures well above the softening point of the fibres of the material.

It is an additional feature of the present invention to provide a process for treatment of acicular material to facilitate its entrance into openings smaller than the actual length of the material.

These features may be readily accomplished by providing an aqueous dispersion containing organic and inorganic constituents which are forced into the mass of nonabsorbent fibres by mechanical means, i.e. vacuum application and/or chemo-physical means. The chemo-physical means, which I prefer to employ, obtains optimum penetration and retention of the constituents in the mass of nonabsorbent fibres to form a coating thereon.

The inorganic materials which have been found to be useful in the process should be of a particle shape and size such that about at least 20% of the material will pass through the interstices of the fibrous mass in only one direction with the remainder of the material of a size such that it will all pass through the interstices in any direction. The particle size reduction may be accomplished by grinding or other means of comminution. The inorganic materials should be so selected that the amount of soluble salts released by the material is below the level at which water insoluble salts can form with the organic materials in the aqueous dispersion.

The organic materials which are useful in the process should be such that part of the organic materials is capable of lowering the surface tension of the dispersion whereby entrance, penetration and retention of the coating material is accomplished, another part of the organic materials to act as a protective colloid for the inorganic material and another part capable of viscosity regulation to keep the inorganic material in suspension and to retain the materials in the mass of nonabsrobent fibers after penetration. Surface active agents employed in the dispersion should be such that they become hydrophobic upon heating. In general, the organic materials used in the process should be such that the whole mass gels before 212° F. is reached to inhibit the inorganic material from leaving the interstices of the nonabsorbent fibres when the mass is removed from the bath and heated. The combined organic materials of the process should as well be capable of forming on drying a bond of sufficient strength to maintain the inorganic materials around the fibres of the mass.

I have found that some silicates and silica when applied as a coating to the fibres of a mat or felt of Fiberglas material will tend to react and to form pseudo ceramic bodies with the glass fibres thus preventing the softening of the mass when the softening temperature of the glass is reached or exceeded. The mass of coated and reacted glass fibres has sufficient mechanical strength to support their own weight and thus the material is capable of withstanding temperatures well above the softening point of the individual fibres. To apply the coating, the fibrous mat, after curing and shaping, is treated with a slurry contining refractory minerals for example, clay and/or powdered calcium silicate and/or amorphous silica sol. To prevent coagulation of the sol in the presence of the silicate a protective colloid is used which can be carboxymethylcellulose. Surfactants are added to facilitate the entry of the slurry into the interstices of the mat to coat all fibres. An acid-containing acrylic emulsion copolymer may be added as a means of providing bond and viscosity.

To prepare an aqueous dispersion coating, the inorganic material constituents may first be mixed to form a slurry. I have found it preferable to employ de-ionized water in preparing the slurry as ordinary water contains soluble salts which tend to react causing undesirable formation of water insoluble calcium, magnesium soaps with organic acids. To de-ionized water are added finely divided clay materials and a mineral product calcium silicate, which may be Wollastonite, a well known form of calcium silicate. This particular material, Wollastonite, has been found to be preferable because it is an acicular type of material. A methylcellulose gum manufactured under the name Methocel (trade mark of Dow Chemical Co.) is added to the mix as a protective colloid to assist in keeping the fine particles in suspension. This gum helps to control the viscosity of the slurry and is useful because of an inherent property which causes gelling on heating whereas the usual types of gums gel only on cooling. Sufficient water is added to the mix to obtain a slurry of about 40% solids.

The choice and proportions of organic and inorganic materials used in the preparation of the aqueous dispersion regulates the viscosity and controls the surface tension of the slurry. A concentrate is prepared which I will call a "soap concentrate," as it contains a fatty acid-rosin-ammonia soap in de-ionized water, which is capable of decomposing on heating. Pamak 10 (a trademark for a tall oil derivative containing 90% fatty acids and 10% rosin acids), consisting primarily of oleic acid, with small amounts of palmitic acid, stearic acid, margaric acid, traces of $C_{19}$ and $C_{20}$ saturated and $C_{20}$ unsaturated acids, abietic acid, pimaric acid and isomers of pimaric and abietic acid is mixed with an ammonia solution to form a soap and decomposes on heating. Viscosity control agents are added to the solution and may comprise an acid-containing acrylic emulsion copolymer, marketed under the trademark name ASE–95, a synthetic detergent of a fatty acid amide type which is a lauric acid diethanolamide, manufactured under the trademark name Hymolon 90, and a colloidal suspension of 30% silica, available under the name of Ludox (a trademark of the Du Pont Company). To this mix is added Methocel and an anti-foaming agent, with sufficient water to form a 9% soap solution.

The mineral slurry is mixed with the "soap concentrate" and diluted with de-ionized water to form the aqueous saturant dispersion. The materials made of nonabsorbent fibres, such as Fiberglas, may be saturated by immersion in the aqueous dispersion. The saturated material is removed from the bath and heated to assist in drying.

To prepare the aqueous dispersion bath for immersion of the material of nonabsorbent fibres the inorganic materials which may be called a clay concentrate and the organic materials which may be called a soap concentrate may be formulated in the following manner.

CLAY CONCENTRATE

As stated previousy, I prefer to use de-ionized water because of the presence of soluble salts in the water, however water which is free of this problem may be used without treatment. To about 1,000 lbs. of (de-ionized) water heated to about 170° to 200° F. is added about 10 lbs. of Methocel. This solution is mixed to disperse the gum and about an additional 3,000 lbs. of cold water is added. About 400 lbs. of calcium silicate (Wollastonite) in finely divided form is added and about 2,500 lbs. of kaolinitic clay is introduced into the agitated mix. Sufficient water, about an additional 36 lbs., is added to bring the slurry to about 40% solids.

SOAP CONCENTRATE

To about 1,000 lbs. of (de-ionized) water heated to about 170° to 200° F. is added about 10 lbs. of Methocel 10 and about 4 lbs. of Methocel 4000, two grades of a cellulose gum. The gum is allowed to slowly disperse in the hot water and about 3,400 lbs. of cold water is added. When the solution is thoroughly mixed about 2 lbs. of an anti-foam material, 2-ethyl-hexanol, is added with about 80 lbs. of ammonium hydroxide and about 150 lbs. of Pamak 10, a tall oil fatty acid-rosin product. The solution is agitated until the foam which forms is dispersed. An acid containing acrylic emulsion copolymer, ASE–95, is slowly added and thoroughly mixed into the solution. Approximately 500 lbs. of a 30% aqueous colloidal silica, Ludox, is added with about 15 lbs. of a fatty acid amide type synthetic detergent, Hymolon 90. The mixture is agitated until homogeneous and adjusted to a pH of about 9.3 to 9.7.

The aqueous dispersion for immersion of the fibrous material may be prepared by a blending of the clay concentrate and soap concentrate. Depending on the nature of the fibrous glass mass to be treated, the means for doing so, the amounts of minerals to be introduced and the effects to be achieved, the saturant dispersion may vary over a wide range. A typical dispersion may be prepared by combining (in that sequence): 1 part by volume of clay concentrate with ½ to 1 part by volume of soap concentrate with 2 to 3 parts by volume of water. This dispersion is agitated continuously and will contain from about 6 to about 25% solids, and at suitable pH, viscosity and surface tension. In a specific case a dispersion of 9–11% solids, pH 9.0 to 9.6 and a viscosity of 52 cps., and a surface tension of 31 to 38 dynes will be found suitable for the process.

The fibrous material, which may be cured and shaped Fiberglas molding in the form of two semi-cylindrical sections or Fiberglas cured and shaped in the form of blocks, is completely saturated by immersion in the clay-silicate-silica dispersion. The needle like form of the calcium silicate, coated with a protective colloid and a wetting agent which appears to lubricate the silicate needles with the result that this acicular material easily passes through interstices in the nonabsorbent material which are smaller than the length of the needles and is able to easily penetrate the interstices of the mat together with the clay and silica and are retained in the mass of fibres to form a coating thereon. The viscosity reagents of the soap concentrate act to prevent run-off of the dispersion after the mass is withdrawn from the slurry. Additionally, the combination of organic reagents in the dispersion are such that a gel is formed before reaching a temperature of 212° F. to assure retention of the coating materials in the mass when heating.

After complete saturation, the fibrous mass is transferred to drying racks and placed in an oven or kiln heated to about 400 to 700° F. to dry the coated fibrous material. The organic material of the coating composition forms on drying a bond strong enough to maintain the inorganic coating materials in contact with the fibres of the mass with the surface active agents decomposing to leave a hydrophobic residue.

Saturating all the material by immersion a coating is obtained which in effect closely associates the silicate-silica with the fibres. I have found that treated material, depending upon the ratio of coating minerals to glass fibre substance, is capable of continually withstanding temperatures greatly above the softening point of the individual fibres of the material, e.g. in the specific case quoted above in excess of 1200° F. Thus these new materials are now employable for high temperature insulation use, and some are capable of passing fire resistance tests.

Although I have used glass fibres as a prime example of nonabsorbent material the invention should not be limited to only this material. The principles of the invention may be equally applicable to mats or felts of other fibres which do not absorb water such as mineral wool fibres, asbestos, nylon to name but a few in distinction from cotton, wool, etc., which readily absorb water.

The specific ingredients and their proportions outlined in the foregoing description have been employed in illustrating the practice of the present invention and should not be construed in any way as limiting the scope of the invention. Variations or modifications thereof will be readily apparent to one skilled in the art and it is intended to include within the invention all such modifications or variations except those which do not come within the scope of the appended claims.

What is claimed is:

1. A process for treating nonabsorbent glass fibre mats which comprises preparing a clay concentrate consisting essentially of a kaolinitic clay and calcium silicate particles in the form of a slurry, said calcium silicate particles being of such shape and size that at least 20% thereof will pass through the interstices of said glass fibre mat in only one direction, the remaining particles being of a size such that they will all pass through the interstices in any direction, and a soap concentrate consisting essentially of a silica sol, an acrylic emulsion polymer and a fatty acid-ammonia soap, mixing the two concentrates to form a clay-silicate-silica slurry in the form of an aqueous dispersion, immersing a preformed fibrous mat of said glass fibre in said dispersion to impregnate said slurry into the mass of the mat, removing the mat after saturation from the dispersion and heating to decompose said fatty acid-ammonia soap and to dry the mat to retain the slurry materials as a coating on the individual fibres of the mat.

2. An aqueous slurry of clay having from 6 to 25% solids adapted for use in treating a mat of glass fibres and consisting essentially of kaolinitic clay and acicular calcium silicate particles, said acicular particles being of such shape and size that at least 20% thereof will pass through the interstices of a glass fibre mat in only one direction, the remaining particles being of a size such that they will all pass through the interstices in any direction, said slurry comprising a methyl cellulose protective colloid, a wetting agent consisting of a fatty acid amide or amine salt which acts to lubricate the acicular particles for longitudinal passage through said interstices, and a viscosity control agent selected from the group consisting of acidic acrylic copolymer emulsion and colloidal silica, whereby to facilitate entry of said particles into the interstices of a mat of glass fibres.

3. A slurry as in claim 2 wherein said slurry has a solids content of from 9 to 11% and the wetting agent is the ammonium salt of tall oil.

4. A slurry as in claim 3, wherein the tall oil contains about 90% fatty acids and the remainder rosin acids.

5. A slurry as in claim 2, wherein the slurry has a solids content of from 9 to 11%, and the slurry has a pH of about 9 to about 9.6, a viscosity of the order of 52 centipoises and a surface tension of about 31 to about 38 dynes.

References Cited

UNITED STATES PATENTS

| | | | |
|---|---|---|---|
| 2,676,118 | 4/1954 | Thomas | 117—166X |
| 3,286,785 | 11/1966 | Shannon et al. | 117—126GIX |
| 3,312,640 | 4/1967 | Ferrigno | 117—100SLX |
| 3,336,155 | 8/1967 | Rowe | 117—166X |
| 3,348,994 | 10/1967 | Rees et al. | 161—170 |

OTHER REFERENCES

Publication "Cellulosics," Paist, Reinhold Plastics Application Series, 1958, TP 986 A2P 33, pp. 199, 200, 201, 203, 211, 227 relied on.

DAVID KLEIN, Primary Examiner

U.S. Cl. X.R.

161—170